United States Patent [19]

Ayala et al.

[11] 4,207,046
[45] Jun. 10, 1980

[54] TAMALE MACHINE

[76] Inventors: Joe C. Ayala, 4307 S. Flores, San Antonio, Tex. 78214; Caesar C. Ayala, 1746 McKinley, San Antonio, Tex. 78210

[21] Appl. No.: 966,808

[22] Filed: Dec. 6, 1978

[51] Int. Cl.² .......................................... A21C 11/18
[52] U.S. Cl. .................................. 425/133.1; 222/142; 222/249; 425/192 R; 425/239; 425/463; 426/281; 426/282
[58] Field of Search ............... 425/463, 133.1, 239, 425/190, 192 R; 222/249-250, 142; 426/281, 282, 512

[56] References Cited

U.S. PATENT DOCUMENTS

| | | | |
|---|---|---|---|
| 1,661,916 | 3/1928 | Allen | 425/133.1 |
| 1,793,981 | 2/1931 | Wescott et al. | 425/239 |
| 2,111,497 | 3/1938 | Shannon | 425/133.1 |
| 2,303,351 | 12/1942 | Gage et al. | 222/142 |
| 2,371,225 | 3/1945 | Curry | 425/133.1 |
| 2,532,131 | 11/1950 | Van Voorst | 425/133.1 |
| 2,908,424 | 10/1959 | Illsley | 222/250 |
| 3,479,970 | 11/1969 | Carbajal | 425/133.1 |

*Primary Examiner*—Jeffery R. Thurlow
*Attorney, Agent, or Firm*—Willard J. Hodges, Jr.

[57] ABSTRACT

A machine for extruding tamale filling having a small tank suitable for meat or bean filling and a larger tank specifically designed for masa dough. Each of the tanks are enclosed containers into which is fitted a floating piston above the ingredients. Air pressure is admitted to each tank through a pressure gauge regulator system to move the pistons down, extruding the ingredients of the tanks through a meat and masa conduit into an encasing nozzle. The work product of the machine is a meat or bean filler encased in masa dough which is wrapped in corn shucks or other suitable wrapping material to form the tamale.

8 Claims, 5 Drawing Figures

TAMALE MACHINE

BACKGROUND OF THE INVENTION

1. Field of the Invention

A device of this invention pertains to a tamale machine which is designed to extrude meat and bean filling encased in a masa dough capusle which, when wrapped, forms a tamale. Tamales have been made by hand for years in a home cooking process. In recent years, for economy in production and speed of production in food factories, numerous mechanical means have been developed.

2. Prior Art

Among the most pertinent prior art patents are the tamale machine by Gage et al., U.S. Pat. No. 2,303,351, which in FIG. 5 discloses an extrusion nozzle having some relevance to applicants' invention. Another patent is the extruder of Curry, U.S. Pat. No. 2,371,225, employing a crank screw piston for extruding masa dough and meat or bean filling. Van Voorst, U.S. Pat. No. 2,532,131, pertains to a tamale forming machine suitable for extruding meat encased in masa dough. The results of the prior art embodiments closely simulate the results of applicants' machine. However, the construction of the machines and the mode of operation substantially vary. Among the more salient features of applicants' machine are the simplicity of construction, ease in cleaning, and control of rate of extrusion. The air driven floating piston having control pressure regulating means extrude an improved product.

SUMMARY OF THE INVENTION

Basically, the device of this invention comprises a base plate preferably of stainless steel on which is mounted a small tank designed for meat and a large tank designed for masa dough. When the containers are filled with ingredients a floating piston is placed in each tank. Lids equipped with gaskets and lid securing means cover each tank. To the lids are connected controllable air pressure to move the floating pistons downward applying pressure to the contents. Air pressure gauges and air pressure regulators are provided for each tank. The desired rate of production and a consistency of content of the tanks determine the optimum operating pressure. In a typical operation, the slow rate of production of the small tank containing the meat ingredient is operated at 10 psi and the large tank containing the masa dough is operated at 5 psi. For faster rates of production or to compensate for variances in viscosity of the ingredients, air pressures may be varied or regulated by the individual pressure regulators for each tank. The inner filling which is normally meat or beans, is ejected from the small tank through the meat conduit which projects into a larger masa conduit at the bottom of the larger tank. The small, meat nozzle projects into the center of the larger masa nozzle and this combination forms an encasing nozzle. The work product of the machine extrudes a meat or bean ingredient encased in masa dough which projects from the encasing nozzle from which the ingredients may be deposited on an endless belt conveyor to be transported to the wrappers or wrapping machines. A mechanical cutter may be employed adjacent the encasing nozzle to cut the ingredients into desired lengths for wrapping.

BRIEF DESCRIPTION OF THE DRAWINGS

For a description of the construction of a preferred embodiment and its operation, reference is made to the attached drawings wherein identical reference characters refer to identical or equivalent components throughout the various views and the subsequent detailed description.

CONSTRUCTION OF THE PREFERRED EMBODIMENT

Figure 2:
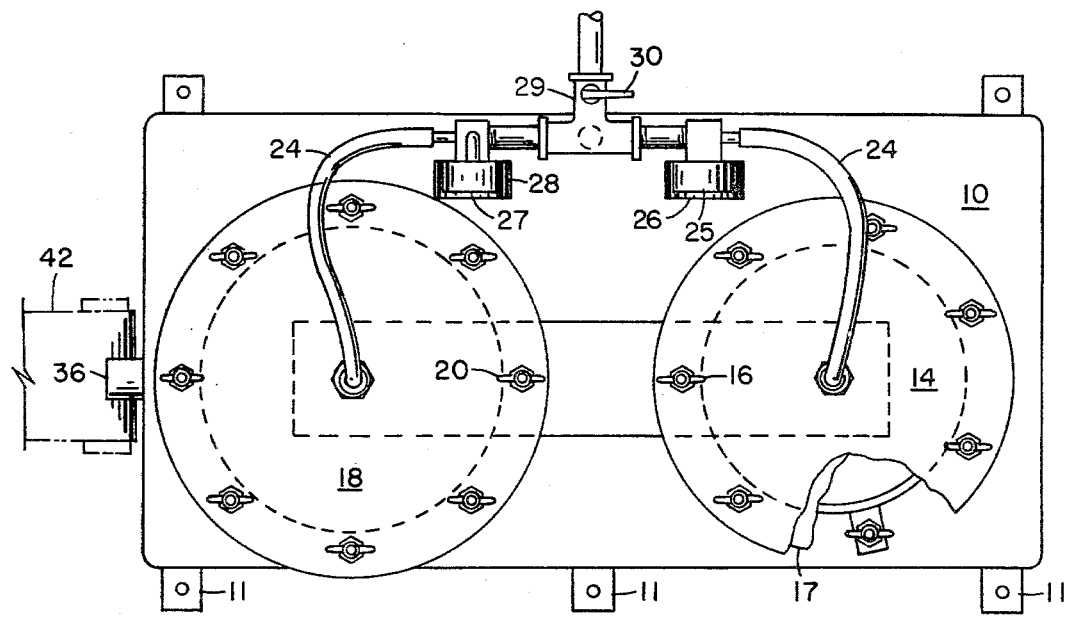
FIG. 2 is a top view of the device of FIG. 1 taken substantially on line 2—2 of FIG. 1 looking in the direction of the arrows.
Figure 1:
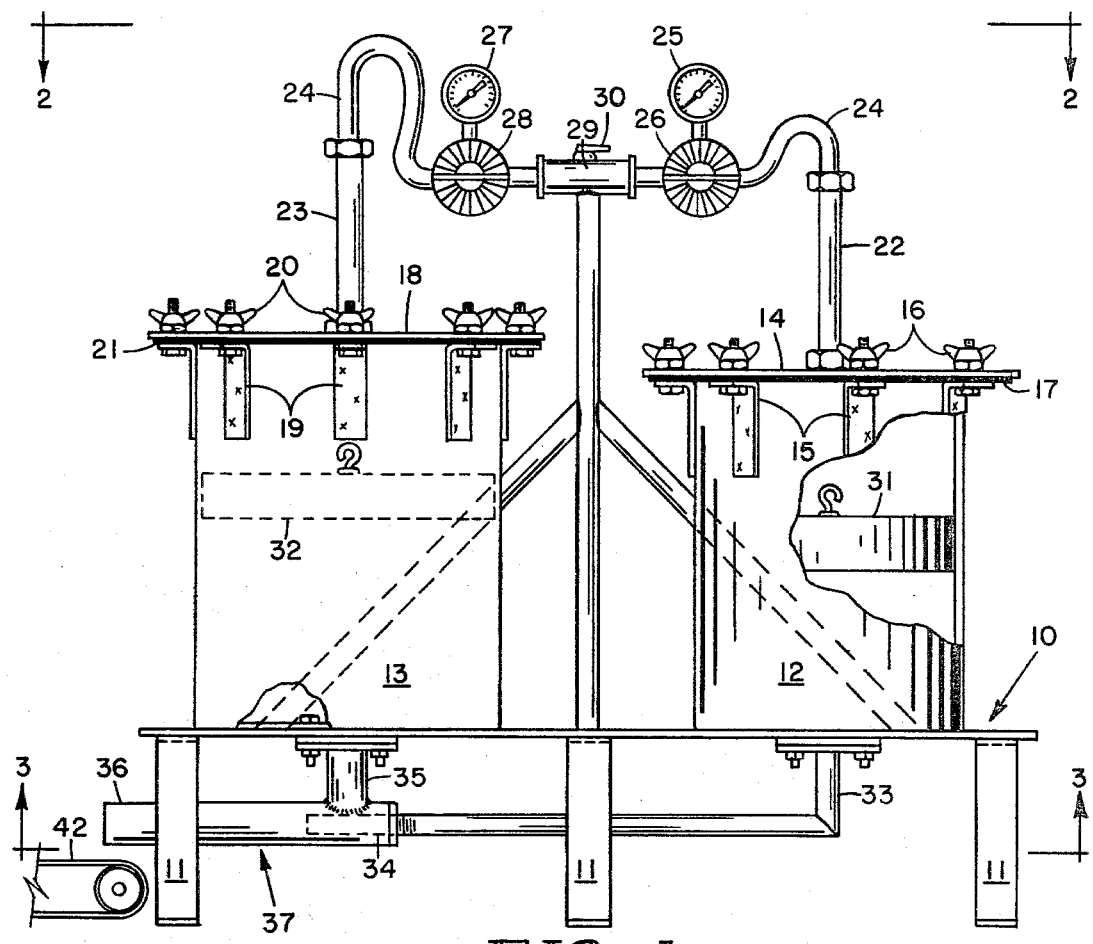
FIG. 1 is a front elevation view of the composite machine illustrating the various components in their relative operating positions.
Figure 3:
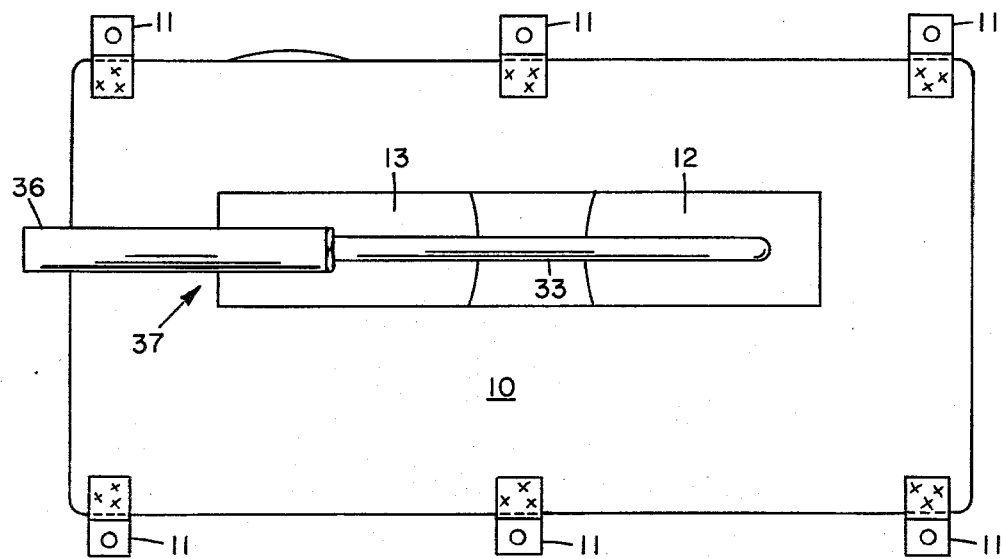
FIG. 3 is a bottom view of the device of FIG. 1 taken substantially on line 3—3 of FIG. 1 looking in the direction of the arrows.

In the preferred embodiment as ilustrated in FIGS. 1 and 3, the base 10 was constructed from a rectangular sheet of 12 gauge stainless steel having a rectangular slot 3"×14" cut out in the center. Six support legs 11 of similar material were attached to the base plate 10 for support. The food processing tanks consisted of a small tank 12 seven inches in diameter and nine and three-fourth inches tall and a large tank 13 eight inches in diameter and ten and three-fourth inches tall. These tanks were constructed from 16 gauge stainless steel with a three-eighths inch lip at the upper edge. The smaller tank 12 is constructed with a one-half inch hole in the bottom of the tank to discharge ingredients and a larger tank 13 was constructed with a one inch hole in its bottom to discharge ingredients. Small tank 12 was provided with a small tank lid 14 constructed of stainless steel with a one-half inch hole in the center for receiving compressed air. The small tank lid 14 was secured to the small tank 12 by means of lid bracket 15 and wing nuts 16. To make the container air tight, a gasket 17 was secured to the surface of the lid 14 contacting the lip of small tank 12. The small tank lid 14 was nine and one-half inches in diameter whereas the larger tank lid 18, constructed from similar material, was ten and one-half inches in diameter. Each of the lids 14 and 18 were constructed with one-half inch holes in the center for receiving air under pressure. The large tank lid 18 was secured to the large tank 13 by means of lid brackets 19, wing nuts 20, and a gasket 21 enclosing the top of large tank 13. Small tank air hose attachment 22 was threadably secured to the center of small tank lid 14 and the large tank air hose attachment 23 was threadably secured to the center of large tank lid 18. Air hoses 24, twenty-four inches in length, having a one-fourth inch inside diameter, were attached to air hose attachments 22 and 23. It should be noted that all materials and plastics employed in the construction must be food grade. In the operation of the device, the air pressure supplied to small tank 12 and large tank 13 must be controlled. Intermediate the air supply "T" 29 and the small tank 12 was interposed a small tank pressure gauge 25 and a small tank pressure regulator 26, and in a similar manner, a large tank pressure gauge 27 and a large tank pressure regulator 28 were interposed between air supply "T" 29 and large tank 13. To deactivate the system, a cut-off valve 30 was positioned in the air supply "T" 29. Small tank floating piston 31 and large tank floating piston 32 were constructed of one and one-half inch thick acrylic plastic having a diameter corresponding with the inside diameter of small tank 12 and large tank 13. This acrylic plastic must, of course, be non-toxic, food grade, and may be provided with a center eye hook or ring for ease of handling and cleaning. Mating with the hole in the bottom of small tank 12 was attached a meat conduit 33 which includes a right angle bend and projects underneath large tank 13 terminating in a meat nozzle 34. Projecting downward from the bottom of large tank 13 was a one inch masa conduit 35 which, after a 90° bend, terminates in masa nozzle 36. This combined structure is best illustrated in FIGS. 1 and 3 and comprises encasing nozzle 37 which, in operation, encases the content of small tank 12 with the content of large tank 13 forming the filling for a tamale.

Figure 4:
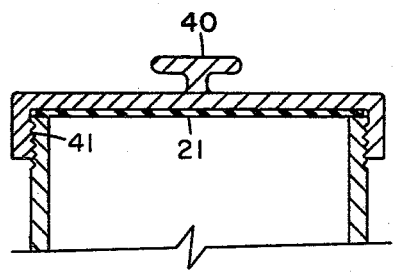
FIG. 4 is a fragmented elevation view of a modified embodiment of the device in a configuration employing a lid threadably engaging a tank.
Figure 5:
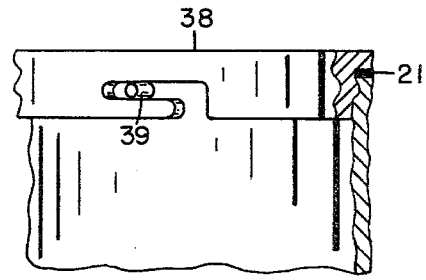
FIG. 5 is a fragmented, elevation view of the modified embodiment wherein the lid is secured to the tank by means of a slot engaging a lug.

Various mechanical means could be employed for securing the lids 14 and 18 to the tanks 12 and 13. A modification is illustrated in FIG. 5 which illustrates a modified construction utilizing a lug engaging top 38 engaging a lug 39 secured to a tank 12 or 13. Another method of construction is illustrated in FIG. 4, which employs a screw top 40 engaging a tank 12 or 13 by means of tank threads 41. In operating the device of this invention at a relatively high rate of production, it would be desirable to position a continuous loop conveyor 42 adjacent the encasing nozzle 37 to receive and convey the work product of the device. In conjunction with this loop conveyor 42 there could be positioned adjacent the encasing nozzle 37 a cutter (not illustrated) to divide the work product in usable portions as they are positioned on the loop conveyor 42.

OPERATION OF THE DEVICE

In the operation of the device of this invention, the ingredients of workable consistency are placed in small tank 12 and large tank 13. The content of the small tank 12 would normally be a finely ground meat or bean filing. The large tank 13 would be filled with the cooked ground corn dough mixture, generally referred to as masa. The floating pistons 31 and 32 are placed on top of the ingredients in the respective tanks 12 and 13. Small tank lid 14 and gasket 17 are secured in position as well as large tank lid 18 and gasket 21. In activating the device, the cut-off valve 30 to the air supply "T" 29 would be opened admitting air through the air hoses 24 to the respective containers. For a slow rate of production, the air pressure to the small tank 12 is regulated at 10 psi and to the large tank 13 at 5 psi. These pressures may be varied to vary the rate of production as well as make the pressures compatible with the consistency of the ingredients of the two tanks 12 and 13. For fast production the pressure to the small tank 12, normally containing the meat, may be increased to 25 psi, and the pressure to the large tank 13, normally containing the masa, increased to 15 psi. In operation at slow rate of production, the machine will produce approximately one dozen tamales per minute. Under fast production, the rate of production would be between two and three dozen tamales per minute. Utilizing the high rate of production, ordinarily a conveyor belt 42, as illustrated in FIG. 1, is desirable to convey the work product to multiple wrappers or wrapping machine (not illustrated). The device of this invention, after use, can be easily disassembled for cleaning and sterilization. For increased capacity and mass production, the size of the containers and components may be varied.

Having described the construction and arrangement of the preferred embodiment of this invention, what is desired to be claimed is all modifications and rearrangements not departing from the scope of equivalents of this invention as defined in the appended claims.

We claim:
1. A tamale filler disperser comprising:
   a. an elongated base upon which is supported,
   b. a first tank capable of receiving and retaining food ingredients,
   c. a second tank capable of receiving and retaining masa dough,
   d. compressed air means communicating with the top portion of said first tank and said second tank,
   e. a floating piston positioned in said first tank adapted to separate the food content from the compressed air,
   f. a floating piston means in said second tank adapted to separate the masa dough and the compressed air, and
   g. a small tank discharge conduit secured in the bottom of said first tank,
   h. a large tank discharge conuit secured in the bottom of said second tank,
   i. said small tank discharge conduit being of a diameter less than said large tank discharge conduit, and small tank discharge conduit projecting into said large tank discharge conduit, the combination forming an encasing nozzle.
2. The invention of claim 1 further comprising:
   a. a lid means for enclosing the top of said first tank,
   b. a lid means for enclosing the top of said second tank, and
   c. said compressed air means attached to and communicating with said tanks through said lid means.
3. The invention of claim 1 wherein said compressed air means further comprises:
   a. a first tank pressure gauge,
   b. a first tank pressure regulator intermediate said compressed air means and said first tank means,
   c. a second tank pressure gauge, and
   d. a second tank pressure regulator intermediate said compressed air means and said second tank.
4. The invention of claim 2 wherein said lid means further comprises:
   a. lid brackets secured to said first tank and said second tank,
   b. lid securing holes in the periphery of said lid means adapted to receive projecting lid brackets,
   c. wing nuts threadably engaging said lid brackets for securing said lid to said tanks, and
   d. gasket means in association with said lid means adapted to enclose said tanks in a manner to receive and retain compressed air.
5. The invention of claim 2 wherein said lid means further includes:
   a. lid lugs projecting from said tanks, and
   b. lid lug slots constructed in said lid means for engaging and retaining said lid lugs.
6. The invention of claim 2 wherein said lid means further comprises a lid threadably engaging said tank enclosing said tank in a manner capable of receiving and retaining compressed air.
7. The invention of claim 1 further comprising a loop conveyor positioned adjacent said encasing nozzle for receiving and conveying the work product of said tamale filler dispenser.

8. The invention of claim 2 wherein said lid means further comprises:
 a. lid brackets secured to said first tank and said second tank,
 b. lid securing holes in the periphery of said lid means adapted to receive projecting lid brackets,
 c. clamps engaging said lid brackets for securing said lid to said tanks, and
 d. gasket means in association with said lid means adapted to enclose said tanks in a manner to receive and retain compressed air.

* * * * *